(12) United States Patent
Galvez et al.

(10) Patent No.: US 11,360,445 B2
(45) Date of Patent: Jun. 14, 2022

(54) SYSTEM AND METHOD FOR CONTROLLING BUILDING MANAGEMENT SYSTEMS FOR SCHEDULED EVENTS

(71) Applicant: Sensormatic Electronics, LLC, Boca Raton, FL (US)

(72) Inventors: Miguel Galvez, Plaistow, NH (US); Walter A. Martin, Ballymena (GB); Danny Hyun, Irvine, CA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/111,981

(22) Filed: Aug. 24, 2018

(65) Prior Publication Data

US 2020/0064790 A1    Feb. 27, 2020

(51) Int. Cl.
*G05B 15/02* (2006.01)
*F24F 11/63* (2018.01)
(Continued)

(52) U.S. Cl.
CPC .............. *G05B 15/02* (2013.01); *F24F 11/63* (2018.01); *E06B 9/68* (2013.01);
(Continued)

(58) Field of Classification Search
None
See application file for complete search history.

(56) References Cited

U.S. PATENT DOCUMENTS

| 7,796,471 B2 | 9/2010 | Guigne et al. |
| 2009/0177503 A1* | 7/2009 | Kawano ................. G06Q 10/02 705/5 |

(Continued)

FOREIGN PATENT DOCUMENTS

| JP | H04124541 | 4/1992 |
| WO | WO 2018/112095 | 6/2018 |

OTHER PUBLICATIONS

Chai et al., "Minimizing Commerical Building Costin Smart Grid: An optimal Meeting Scheduling Approach", 2014, IEEE international Conference on Smart Grid Communications, pp. 764-769 (Year: 2014).*

(Continued)

*Primary Examiner* — Jason Lin
(74) *Attorney, Agent, or Firm* — ArentFox Schiff LLP

(57) ABSTRACT

An event automation system controls building management systems (e.g. building automation, access control, and/or security systems of a building) for scheduled events. An occupancy module generates occupancy information for event spaces where events are scheduled via occupancy sensors installed at the event spaces. A building automation module instructs distributed devices of the building management systems to control the environmental settings of the event spaces based on the occupancy information and stored space, attendee, and schedule information. The event automation system also facilitates scheduling the events at event spaces of the building based on configuration information from an event organizer (e.g. invited attendees, start and end times, and activities to be performed at the event), required automation features for the event, location information and exercise preferences for the invited attendees, and/or aggregated usage information for the event spaces.

12 Claims, 7 Drawing Sheets

(51) Int. Cl.
F24F 120/10 (2018.01)
H05B 47/10 (2020.01)
E06B 9/68 (2006.01)

(52) U.S. Cl.
CPC ... *E06B 2009/6809* (2013.01); *F24F 2120/10* (2018.01); *H05B 47/10* (2020.01)

(56) References Cited

U.S. PATENT DOCUMENTS

| | | | |
|---|---|---|---|
| 2010/0262297 A1* | 10/2010 | Shloush | H05B 47/175 |
| | | | 700/276 |
| 2012/0005728 A1* | 1/2012 | Farrell | G06Q 10/00 |
| | | | 726/4 |
| 2013/0151302 A1* | 6/2013 | Kho | G06Q 10/109 |
| | | | 705/7.19 |
| 2013/0226645 A1* | 8/2013 | Renaghan | G06Q 10/1095 |
| | | | 705/7.19 |
| 2014/0108085 A1* | 4/2014 | Henriksen | G06Q 10/109 |
| | | | 705/7.19 |
| 2014/0207510 A1* | 7/2014 | Valle | G06Q 10/1095 |
| | | | 705/7.19 |
| 2014/0225528 A1 | 8/2014 | Clayton | |
| 2015/0006218 A1* | 1/2015 | Klemm | G06Q 10/1095 |
| | | | 705/7.19 |
| 2015/0193739 A1* | 7/2015 | Min | G06Q 10/1095 |
| | | | 705/7.19 |
| 2015/0242801 A1 | 8/2015 | Cudak et al. | |
| 2016/0062332 A1* | 3/2016 | Call | F24F 11/83 |
| | | | 700/276 |
| 2016/0069584 A1 | 3/2016 | Holaso et al. | |
| 2016/0180259 A1* | 6/2016 | Marianko | H04L 51/043 |
| | | | 705/5 |
| 2016/0195856 A1 | 7/2016 | Spero | |
| 2016/0300468 A1 | 10/2016 | Stricker et al. | |
| 2016/0301373 A1 | 10/2016 | Herman et al. | |
| 2016/0351045 A1 | 12/2016 | Salter | |
| 2017/0026806 A1* | 1/2017 | Jampani | H04B 17/318 |
| 2017/0027045 A1 | 1/2017 | Chemel | |
| 2017/0123391 A1 | 5/2017 | Sinha et al. | |
| 2017/0176961 A1 | 6/2017 | Tirpak | |
| 2017/0309142 A1 | 10/2017 | Phillips | |
| 2018/0047230 A1 | 2/2018 | Nye | |
| 2018/0090138 A1 | 3/2018 | Finn et al. | |
| 2018/0206096 A1 | 7/2018 | Sharma et al. | |
| 2018/0330589 A1 | 11/2018 | Horling | |
| 2019/0053329 A1 | 2/2019 | Deros et al. | |

OTHER PUBLICATIONS

International Search Report and Written Opinion of the International Searching Authority, dated Oct. 28, 2019, from International Application No. PCT/US2019/046689, filed on Aug. 15, 2019. 26 pages.
Partial International Search, dated Nov. 22, 2019, from International Application No. PCT/US2019/046683, filed on Aug. 15, 2019. 9 pages.
International Search Report and Written Opinion, dated Mar. 20, 2020, from International Application No. PCT/US2019/046683, filed on Aug. 15, 2019. 15 pages.
International Preliminary Report on Patentability, dated Mar. 11, 2021, from International Application No. PCT/US2019/046683, filed on Aug. 15, 2019. 11 pages.
International Preliminary Report on Patentability dated Mar. 11, 2021, from International Application No. PCT/US2019/046689, filed on Aug. 15, 2019. 10 pages.

* cited by examiner

SYSTEM AND METHOD FOR CONTROLLING BUILDING MANAGEMENT SYSTEMS FOR SCHEDULED EVENTS

RELATED APPLICATIONS

This application is related to U.S. application Ser. No. 16/111,991 filed on Aug. 24, 2018, entitled "System and Method for Detecting Room Occupancy with Beamforming Microphone Arrays," now U.S. Patent Publication No.: 2020/0064791, which is incorporated herein by reference in its entirety.

BACKGROUND OF THE INVENTION

Building management systems such as building automation systems, security systems and access control systems are often installed within premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

In general, building management systems include one or more control panels or controllers connected to distributed devices positioned throughout the building.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples. Sensors for building automation systems include, for example, temperature sensors, light sensors, humidity sensors, volatile organic compound (VOC) sensors. User interface elements for building automation systems might include touchscreen displays (for example, as part of a thermostat or other indicator). Actuators for building automation systems include dampers, chillers, smart lighting systems, motorized window shades, projectors and projector screens, and other mechanical equipment, to list a few examples.

Security systems typically include intrusion control panels and their own distributed devices. The distributed devices detect indications of intrusions, building security breaches and unauthorized access at or within the building and report to the intrusion panels. Security distributed devices include sensors such as motion sensors, door and window relays, thermal sensors, and surveillance cameras that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Access control systems typically include control panels such as system controllers and door controllers, and distributed devices, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors, signaling that doors should be unlocked, and activating elevators. Alarms can be generated upon unauthorized entry.

Recently, it has been proposed to use connected services systems to monitor building management systems. Connected services systems are remote systems that communicate with the building management systems and are sometimes administered by separate business entities than the owners and/or occupants of the buildings, which contain the building managements systems. For example, the connected services system can be administered by a building management system manufacturer and/or an entity providing service on the building management systems.

Occupants of these buildings often use spaces of the buildings such as offices or conference rooms to hold scheduled events. Examples of events might include work sessions, meetings, or presentations, among others. Organizers of these meetings schedule spaces based upon seating occupancy, space availability and available amenities (e.g. audio/visual equipment).

SUMMARY OF THE INVENTION

In general, there is a need for building and space management systems that aid occupants in using the buildings and spaces of the buildings more intelligently and efficiently. Such a system would generally employ sensors for discerning which occupants are occupying which spaces of the building at any moment. The system uses occupancy information along with other information such as environmental status of the building to determine how the building amenities can be used most efficiently.

A building automation system is envisioned that allows organizers of events to specify configuration information for the events such as required seating capacity and basic amenities, but also more detailed building automation features such as climate and lighting settings, projector screen requirements, and raising or lowering the shades, among other examples. The various automation systems employed in each event space are integrated into a common control system that is further integrated with an event scheduling system.

According to this system, occupancy sensors are deployed in and around the event spaces in order to generate occupancy information, which might include quantities and identities of present attendees in the spaces. In one example, the occupancy sensors include wireless receivers for detecting Bluetooth or other similar signals from mobile computing devices or other types of beacon generating devices. The wireless receivers receive broadcast identification information for users of the devices, which the system uses to identify the present attendees. In another example, a camera system having video analytics and facial recognition functionality is deployed in a ceiling of the event space in order to generate the occupancy information.

Using this capability, for example, the system can detect when organizers or other key attendees of the events are present in the space and infer that the event has begun. In response, the environmental conditions of the event space can be controlled based on the detailed configuration settings by sending instructions to the building management systems controlling the event spaces.

The building automation system can also include integration with an access control system of the building. Attendee information (e.g. identities of occupants of the building who are invited or specified as attending the events by the organizers of the events) is sent to the access control system, which configures the access privileges for the event space to allow only attendees to enter, or to allow attendees to enter only during the time period specified for the event. The space automation system also receives from the access control system identification information for individuals who were granted access to the event spaces (e.g. by engaging with door controllers controlling access to the spaces), allowing the system to send email, text or other notifications to any missing attendees to remind them of the event and its location. Similarly, the organizers can access the attendance information for the events, for example, by receiving accurate reports of which attendees were or were not present. In another example, the space automation system automatically reschedules the events if a certain percentage of attendees, or a key attendee (identified by the organizer in the configuration settings), is not in attendance.

Yet another enhancement to the proposed building automation system includes integration with centrally controlled HVAC systems. As previously discussed, when the event organizers schedule event spaces, they can specify any required amenities and ambient environmental preferences in the configuration settings. However, the organizers will have no way of determining which event spaces are optimal for overall efficiency of the building management systems (such as energy efficiency, for example). In one example, a selected event space could be positioned between several other unused spaces. To maximize energy efficiency, it is beneficial to select a space that is near other heavily used spaces such that residual heating, would make it easier to heat the selected space. Similarly, selection of a space that is scheduled for consecutive events (before and/or after the time period for the event being scheduled) is more efficient than selecting one that is sparsely used such that the temperature has to be raised and lowered rather than kept constant. In light of these additional factors in scheduling event spaces, event space schedule information and system usage information (e.g. for the HVAC system controlling the event spaces) can be used to optimize energy efficiency in the event space selection process.

In one example, the building automation system is equipped with a scheduling module (e.g. incorporating artificial intelligence or other types of algorithms) that automatically selects event spaces based on both the configuration settings provided by the event organizers as well as the building's overall environmental efficiency. Additionally, the selection is dynamically updated as events are cancelled or rescheduled such that environmental efficiency is maintained at an optimal level.

In general, according to one aspect, the invention features a building automation method. Configuration information for events to be scheduled at spaces of a building is received, and required building automation features and location information for the events are determined based on the configuration information. The events are then scheduled at the spaces based on the required building automation features and the location information.

In one embodiment, aggregated usage information for the spaces is also generated, and the events are further scheduled at the spaces based on the aggregated usage information. For example, based on the aggregated usage information, the events are scheduled at spaces that are indicated as being located near other spaces being used simultaneously or are indicated as having events scheduled immediately before and/or after the events being scheduled.

In additional embodiments, the required building automation features are determined based on anticipated activities of the events to be scheduled, and the location information is generated based on exercise preferences or location information for the attendees indicated as attending the events, according to the configuration information.

In general, according to another aspect, the invention features a method of operation of a building automation system of a building, in which occupancy information is generated for spaces of the building where events are scheduled. Event status information is then generated based on the occupancy information, and environmental conditions of the spaces are controlled based on the event status information.

In embodiments, the occupancy information is generated in a number of ways. In one example, occupancy sensors at the spaces detect present attendees by wirelessly receiving identification information from the attendees' user devices. In another example, access control readers that control access to the spaces detect present attendees by receiving identification information from the attendees as they engage with the access control readers. In another example, the occupancy information is generated based on analyzing image data depicting attendees that are present at the spaces.

Similarly, the event status information can be generated in different ways, including based on whether the occupancy information indicates that a predetermined portion of the invited attendees or that particular attendees are present at the spaces.

The environmental conditions of the spaces are controlled by sending instructions to distributed devices of the building automation system, raising or lowering projector screens, opening or closing blinds, adjusting lighting levels and/or adjusting climate conditions. The environmental conditions can also be based on preferences of organizers and/or attendees of the events.

In additional embodiments, access to the spaces is granted only to attendees of the events, alerts are sent to organizers and/or attendees of the events based on the event status information, and the events are rescheduled based on the event status information.

In general, according to another aspect, the invention features a building automation system comprising a scheduling module. The scheduling module receives event configuration information for events to be scheduled, determines required building automation features and location information for the events based on the event configuration information, and schedules the events at the spaces based on the required building automation features and location information.

In general, according to another aspect, the invention features a system for controlling one or more building management systems of a building for scheduled events. The system comprises an occupancy module, distributed devices of the one or more building management systems, and a space automation module. The occupancy module generates occupancy information for spaces of the building where the events are scheduled. The space automation module receives the occupancy information, generates status information based on the occupancy information, and sends instructions to the distributed devices to control environmental conditions of the spaces based on the event status information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
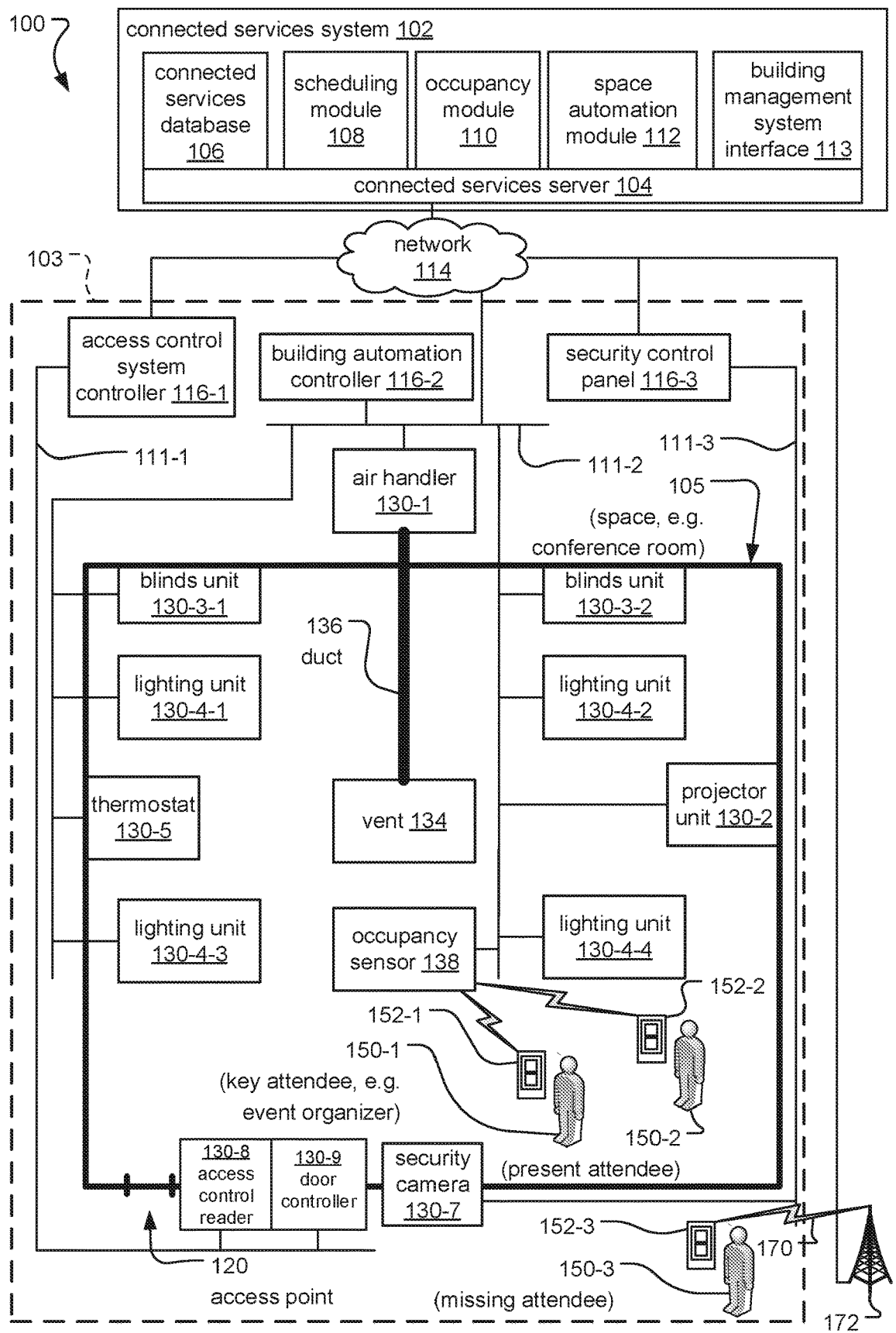
FIG. 1 is a schematic diagram showing an exemplary event automation system according to the present invention.

FIG. 1 is a schematic diagram showing an exemplary event automation system 100 according to the present invention.

The event automation system 100 controls building management systems installed at premises such as buildings 103 (e.g. offices, hospitals, warehouses, retail establishments, shopping malls, schools, multi-unit dwellings, government buildings, or casinos) for scheduled events such as meetings, presentations, conferences, examinations, work sessions, parties, banquets, to list a few examples. The event automation system 100 also facilitates scheduling of the events at event spaces 105 of the buildings 103.

The event spaces 105 are areas of the buildings 103 where events are held. The event spaces 105 include, for example, offices, conference rooms, workspaces, common areas, recreational areas, and/or laboratories. For the sake of demonstration, the illustrated example shows one event space 105. However, buildings 103 can have multiple event spaces 105.

The scheduled events have one or more attendees 150, which are individuals such as occupants or visitors to the building 103 that participate in the events or are invited to participate in the events. Among these are key attendees 150-1, present attendees 150-2 and missing attendees 150-3. The key attendees 150-1 are high-priority attendees to the events (e.g. such that the events require the presence of the key attendees 150-1 to proceed) and include, for example, organizers of the events, presenters, and/or supervisors. The present attendees 150-2 are attendees 150 who are present (e.g. physically at the event space 105 at the time of the event). The missing attendees 150-3 are attendees 150 that were indicated by the event organizers as invited to the events but who are not present. The illustrated example shows one key attendee 150-1 and one present attendee 150-2, both of which are in the event space 105, and one missing attendee 150-3, who is in the building 103 but not in the event space 105.

The attendees 150 carry and/or operate mobile computing devices 152, which could be a laptop computer, tablet computer, phablet computer (i.e., a mobile device that is typically larger than a smart phone, but smaller than a tablet), or a smart watch, to list a few examples.

The event automation system 100 includes a connected services system 102, which, at a high level, communicates with the building management systems installed at the building 103.

In general, the building management systems control and monitor various equipment and conditions throughout the building 103 and/or the event spaces 105 and can include building automation systems, fire alarm systems, security systems, and/or access control systems, among other examples.

These building management systems typically include control panels or controllers 116 and distributed devices 130 positioned throughout the building 130. The control panels 116 direct the functionality of the respective building management systems by receiving signals and/or data (for example, from the distributed devices 130), sending instructions, and determining and sending status information or sensor data, among other examples, to be displayed on or utilized by the distributed devices 130.

The distributed devices 130 communicate with their respective control panels 116 via safety and automation network 111 of the building 103. These safety and automation networks 111 support digital and/or analog communication between the distributed devices 130 and the respective control panels 116. In some embodiments (not illustrated), the distributed devices 130 could all be connected to the same safety and automation network 111.

In the illustrated example, the building 103 includes a building automation system, an access control system, and a security system.

The building automation system, which, in general, controls and monitors physical plant aspects of the building 103 and aspects of business-specific electrical, computer, and mechanical systems, includes a building automation controller 116-2, which is connected via the safety and automation network 111-2 to building automation distributed devices 130, including an air handler 130-1, a projector unit 130-2, blinds units 130-3, lighting units 130-4, and a thermostat 130-5. The air handler 130-1 heats, cools and/or circulates air throughout the building 103 via ducts 136 and vents 134. The projector unit 130-2 raises or lowers a projector screen. The blinds units 130-3 control window coverings such as blinds by, for example, raising, lowering, opening, closing and/or controlling other physical mechanisms for adjusting the amount of light allowed to pass through the window. Lighting units 130-4 control illumination (e.g. of the event space 105), for example, via lighting mechanisms such as light bulbs. The thermostat 130-5 generates sensor data indicating climate conditions for particular areas of the building 103 (e.g. via temperature, humidity, and/or other sensors), displays or otherwise indicates status information, receives input indicating climate preferences (e.g. via a touchscreen display or other user interface), and controls the climate conditions by sending the sensor data to the building automation controller 116-2 and/or sending instructions to the air handler 130-1 based on the sensor data.

The security system, in general, detects indications of intrusions, building security breaches and unauthorized access at or within the building 103 and alerts managers and/or occupants of the building 103. The security system includes a security control panel 116-3, which is connected via the safety and automation network 111-3 to security system distributed devices 130, including, for example, a security camera 130-7. The security camera 130-7 captures image data depicting areas of the buildings, which is monitored, stored, and/or analyzed, for example, via video analytics and facial recognition processes. Other distributed security devices (not illustrated) include motion detectors, door and window relays, network video recorders, among other examples.

The access control system, in general, controls access through access points 120 (e.g. doors, elevators) to restricted areas of the building 103 including event spaces 105. The access control system includes an access control system controller 116-1, which is connected via the safety and automation network 111-1 to access control distributed devices 130, including, for example, a door controller 130-9, and an access control reader 130-8. The access control reader 130-8 receives input from occupants of the building 103 seeking access through the access points 120 to the restricted areas. The door controller 130-9 verifies the input by, for example, confirming that the occupant who entered the input is authorized to access the access point 120 based on authorization information, which might include a list of users authorized to enter restricted areas, and controls access through the access point 120 (e.g. by unlocking a door via a door strike). In one example, the access control reader 130-8 includes a wireless receiver, which receives identification information broadcast or otherwise transmitted by the mobile computing devices 152, identification badges, and/or beacon devices of the attendees 150, among other examples.

The access control system controller 116-1, building automation controller 116-2, security control panel 116-3, distributed devices 130, and mobile computing devices 152 are connected to the connected services system 102 via a public and/or private network 114, which can be a leased data connection, a private network built for a specific enterprise client and/or a public network 114, in examples. In some cases, the control panels 116 have been given network connectivity to communicate with the connected services system 102; in other cases, testing computers connected to the control panels 116 function as gateways. The mobile computing devices 152 connect to the public network 114 via wireless communication links 170 to a cellular radio tower 172 of a mobile broadband or cellular network or public and/or private wired data networks such as an enterprise network, Wi-Max, or Wi-Fi network, for example. Additionally, the distributed devices 130 communicate with the connected services system 102 via their respective control panels 116 or more directly via the safety and automation network 111 and the public and/or private network 114.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers. The connected services server system 104 also functions as an application server that communicates with the mobile computing devices 152.

The connected services server system 104 executes modules, including a scheduling module 108, an occupancy module 110, and a space automation module 112. Each of these modules is associated with separate tasks. In some cases, these modules are discrete modules or they are combined with other modules into a unified code base. They can be running on the same server or different servers, virtualized server system, or a distributed computing system.

The connected services system 104 also includes a connected services database 106, which, in general, stores information about the various building management systems and occupants, as well as scheduled event information.

The scheduling module 108 schedules the events at the event spaces 105 based on configuration information provided by the event organizer (e.g. via the mobile computing device 152-1) and/or other data stored in the connected services database 106 such as building automation amenities provided in each space, location information, climate preferences, and exercise preferences for attendees 150 of the events, and usage information for potential event spaces 105 and potential neighboring event spaces.

The occupancy module 110 generates occupancy information (e.g. quantities and identities of present individuals) for the event spaces 105. The occupancy module 110 generates the occupancy information via occupancy sensors 138 at the event spaces 105. The occupancy sensors 138 detect the presence of individuals in the event spaces 105. In one example, the occupancy sensor 138 receives broadcast identification information from the mobile computing devices 152 or other user devices carried and/or operated by the attendees 150. Alternatively, the occupancy module can also generate the occupancy information based on identification information for event attendees 150 engaging with the access control reader 130-8 in order to access the event space 105, or based on image data generated by the security camera 130-7 at the event space (e.g. via image analytics and facial recognition).

The space automation module 112 determines the status of the event (e.g. whether the event has stared based on the quantity or identities of the attendees 152, or whether it should be cancelled and rescheduled). Based on this event status, the space automation module 112 controls environmental conditions based on the configuration information provided by the event organizer, as well as preferences of the event attendees 150 specified in the connected services database 106. Additionally, the space automation module 112 sends alerts to the mobile computing devices 152-3 of missing attendees 150-3 and/or automatically reschedules the events based on the occupancy information.

The connected services system 102 also includes a building management system interface 113. The building management system interface 113 operates as the interface between the scheduling module 108, occupancy module 110, or space automation module 112 and the control panels 116 or distributed devices 130. In particular, the building management system interface 113 converts instructions from the modules 108, 110, 112 into instructions that are formatted into the protocol implemented by the particular panel 116 or device 130. Additionally, the building management system interface 113 receives information such as device events from the control panels 116 or distributed devices 130 and converts those device events into a uniform format that can be consumed by the modules 108, 110, 112, regardless of the underlying protocol implemented by the panels and distributed devices.

Figure 2:
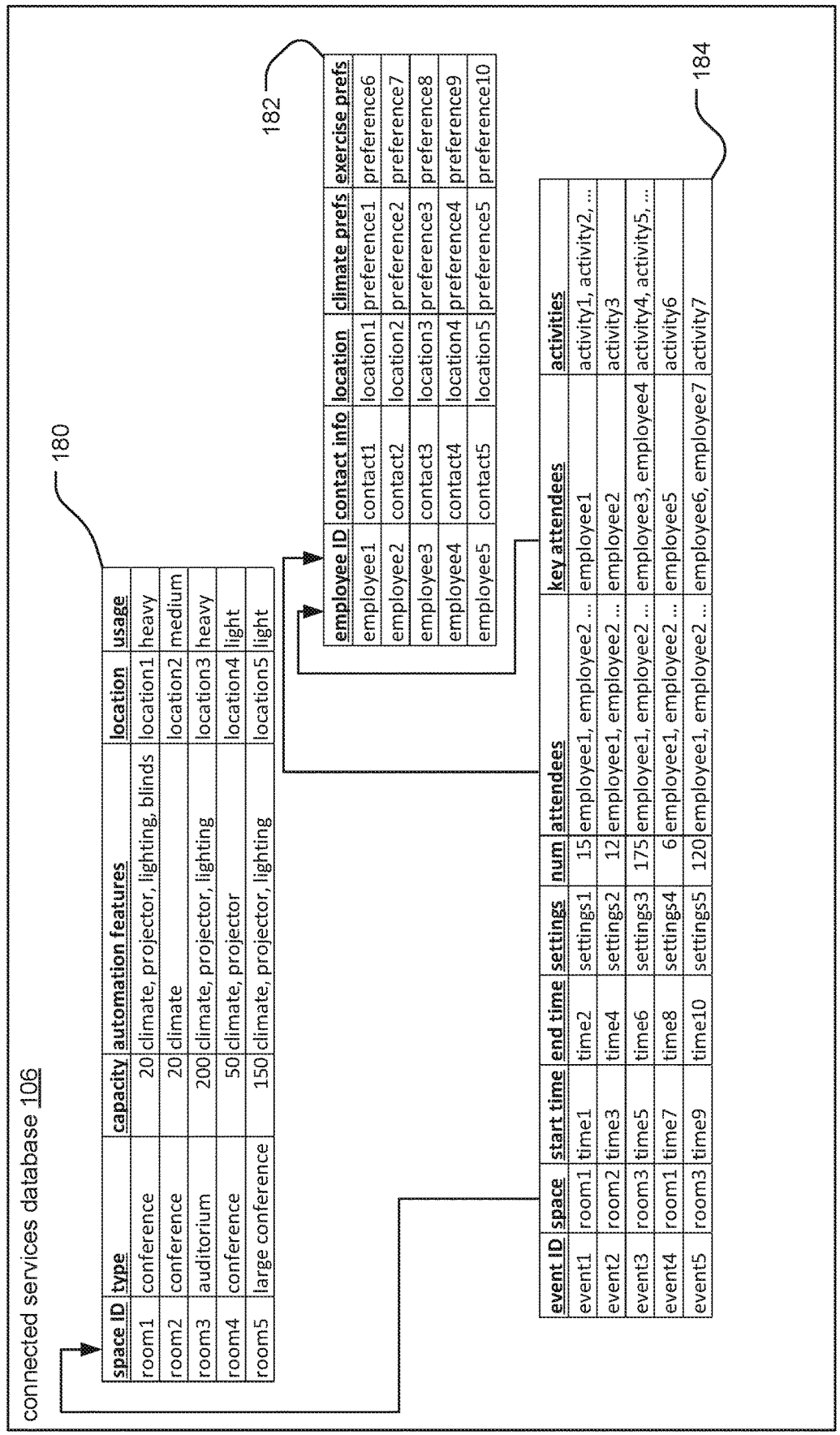
FIG. 2 is a schematic diagram showing an exemplary connected services database of the event automation system.

FIG. 2 is a schematic diagram showing an exemplary connected services database 106. The database 106 includes a space table 180, an attendee table 182, and a scheduled events table 184.

The space table 180 includes information about the event spaces 105 and includes columns for a space ID, type, capacity, building automation features, location and usage. The space ID includes identification information for each space 105 such as a unique identifier. The type column includes descriptive information about the purposes and/or capabilities of the different spaces 105. The capacity column includes capacity information, indicating how many occupants each space 105 can accommodate. The automation features column indicates which building automation features and/or amenities are available to be controlled in each space 105. The location column includes location information for the spaces 105, which can be indicated with respect to stored map and/or coordinate information for the building 103, or indoor positioning system data, among other examples. The usage column includes usage information for the spaces, which can be based on aggregated event information for the distributed devices 130 in the space 105, energy consumption information, and/or schedule information.

In the illustrated example, the event space 105 identified as "room1" in the space table 180 is a conference room that can accommodate 20 occupants, includes climate, projector, lighting and blinds automation capabilities (e.g. via thermostats 130-5, ducts 136, vents 134, projector units 130-2, lighting units 130-4, and blinds units 130-3 installed in the space 105), is located at "location1" and has "heavy" usage (indicating, for example, that the distribute devices 130 in the space 105 generate event information indicating a relatively high amount of usage of those devices, the distributed devices 130 and other devices in the space 105 consume a relatively high amount of energy, and/or that the space 105 generally has a relatively high number of events scheduled).

The attendee table 182 includes information about potential attendees of the events in one or more buildings 103. In embodiments, the attendee table 182 can be or include data from human resources management systems for entities occupying the buildings 103. The attendee table 182 includes columns for employee ID, contact information, location, climate preferences, and exercise preferences. The employee ID includes identification information for the attendees 150. The contact information includes information to be used by the scheduling module 108 and/or the space automation module 112 to contact or send alerts to the attendees 150, such as email addresses, phone numbers and/or other contact information. The location column includes location information for the attendees 150, which might indicate the current location of the attendee (e.g. based on data from tracking systems or access control systems installed in the buildings 103 and/or mobile computing devices 152 carried and/or operated by the attendees 150) and/or a typical location for the attendee 150 such as the attendee's 150 office or department location. The location information, as before, can be indicated with respect to stored map and/or coordinate information for the building 103, or indoor positioning system data, etc. The climate preferences column indicates individual preferences for the environmental conditions of areas occupied by the attendees 150, including temperature, humidity, and lighting settings, among other examples. The exercise preferences column includes indicates individual preferences for the attendees 150 regarding whether additional exercise is desired by the attendees 150.

In the illustrated example, the attendee 150 identified as "employee 1" has contact information "contact1", is currently (or has an office) located at "location1", and has climate and exercise preferences indicated by "climate1" and "preference1", respectively, which might include information (not illustrated) such as a preferred temperature of 72 degrees or an exercise goal to walk more during the day, for example.

The scheduled events table 184 includes information about the events scheduled at event spaces 105 in the building 103. The scheduled events table 184 includes columns for an event ID, space, start and end times, settings, number, attendees, key attendees, and activities. The event ID includes identification for the events such as unique identifiers. The space column indicates which event space 105 the event is scheduled at, with reference to the event spaces 105 included in the space table 180. The start and end time columns include time and date information indicating when the scheduled events are intended to start and end respectively. The settings column includes configuration information provided by the event organizers of the events, including desired date and time information, availability information, desired location, desired amenities and automation features, among other examples. The number column indicates the number of attendees 150 indicated as attending or invited to each scheduled event. The attendees column includes identification information for all attendees 150 for the event, and the key attendees column includes identification information for all key attendees 150-1 indicated for the event, both with reference to the attendees 150 included in the attendee table 182. The activities column includes information about activities to be performed at the event (e.g. which may require the use of building automation features).

In the illustrated example, the event identified as "event1" is located in the event space 105 identified in the space table 180 as "room1", starts at "time1", ends at "time2", has configuration information represented by "settings1", has 15 invited attendees 150, which include at least the attendees 150 identified as "attendee1" and "attendee2" in the attendee table 182, has a key attendee 150-1 identified as "attendee1" in the attendee table 182 (who might be, for example, the event organizer or a presenter at the event), and has expected activities "activity1" and "activity2".

Figure 3:
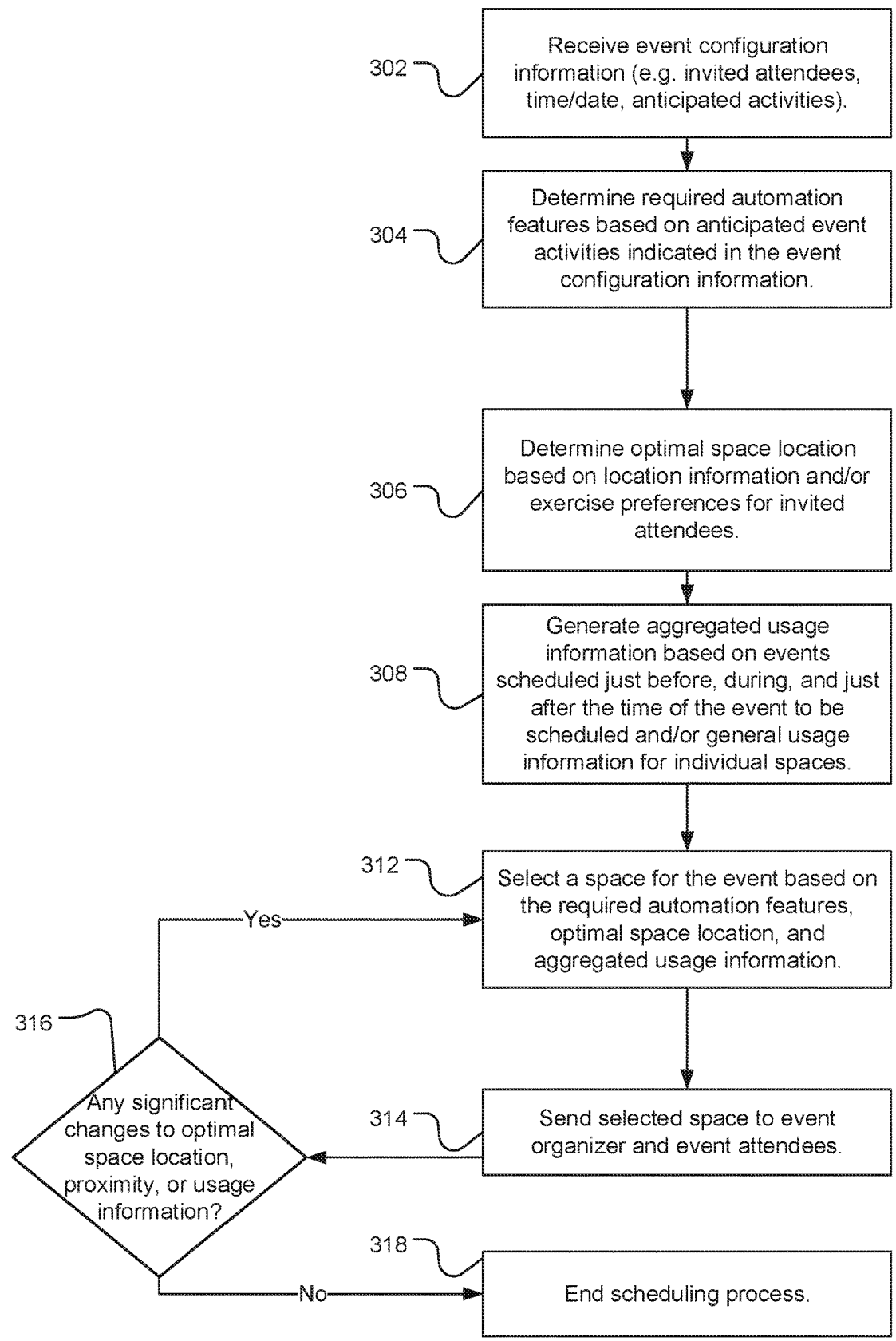
FIG. 3 is a flow diagram showing an example of how a scheduling module of the event automation system schedules events at event spaces.

FIG. 3 is a flow diagram showing an example of how the scheduling module 108 schedules events at event spaces 105.

In step 302, the scheduling module 108 receives event configuration information from the event organizer 150-1, including possibly information about invited attendees 150, start and end times, and information about activities to be performed at the event. In one example, the mobile computing device 152-1 receives input from the event organizer indicating the configuration information (e.g. via a touchscreen display of the mobile computing device 152-1) and sends the configuration information to the scheduling module 108 via the public and/or private network 114.

In step 304, the scheduling module 108 determines the required automation features for the event based on the configuration information (e.g. based on anticipated event activities indicated).

In step 306, the scheduling module 108 determines an optimal location for the event space 105 based on location information and/or exercise preferences for the invited attendees 150 retrieved, for example, from the attendees table 182 of the connected services database 106.

In step 308, the scheduling module 108 generates aggregated usage information. The aggregated usage information is generated based on scheduled event information retrieved from the scheduled events table 184 of the connected services database 106 (e.g. events scheduled just before, during, and just after the event to be scheduled) and/or based on usage information for the event spaces 105 retrieved from the space table 180 of the connected services database 106.

In step 312, the scheduling module 108 selects a space for the event based on the required automation features, optimal location, and aggregated usage information generated in steps 304, 306, and 308 respectively.

In one example, the selected event space 105 is positioned between other event spaces 105 with events scheduled at the same time and the space 105 itself has consecutive events scheduled (before and/or after the time period for the event being scheduled), maximizing energy efficiency.

In another example, the selected event space 105 is positioned relatively far from attendees 150 whose exercise preferences indicate that they desire more exercise, and relatively near attendees 150 whose exercise preferences indicate that they do not desire more exercise.

In another example, the selected event space 105 offers at least all of the required automation features based on the configuration information and/or the expected activities for the event.

In yet another example, the event is scheduled at a time when the sun shines excessively brightly through certain windows of the building 103, and the selected event space 105 offers automated window blinds functionality (e.g. via blinds units 130-3 installed at the event space 105) and was selected over other potential event spaces 105 that do not offer automated window blinds functionality.

In step 314, information identifying the selected event space 105 (such as ID and/or location) is sent to the attendees 150 including the event organizer 150-1.

In step 316, the scheduling module 108 continually re-evaluates the required automation features, optimal space location, and aggregated usage information of steps 304, 306 and 308 respectively based on updates to the configuration information, scheduled events, and/or usage information. If no significant changes are detected up to a predetermined amount of time before the start of the event, the scheduling process ends in step 318. On the other hand, if the scheduling module 108 detects any significant changes, the selection, notification, and re-evaluation processes of steps 312, 314 and 316 are repeated until no significant changes are detected up to the predetermined amount of time before the start of the event.

Figure 4A:
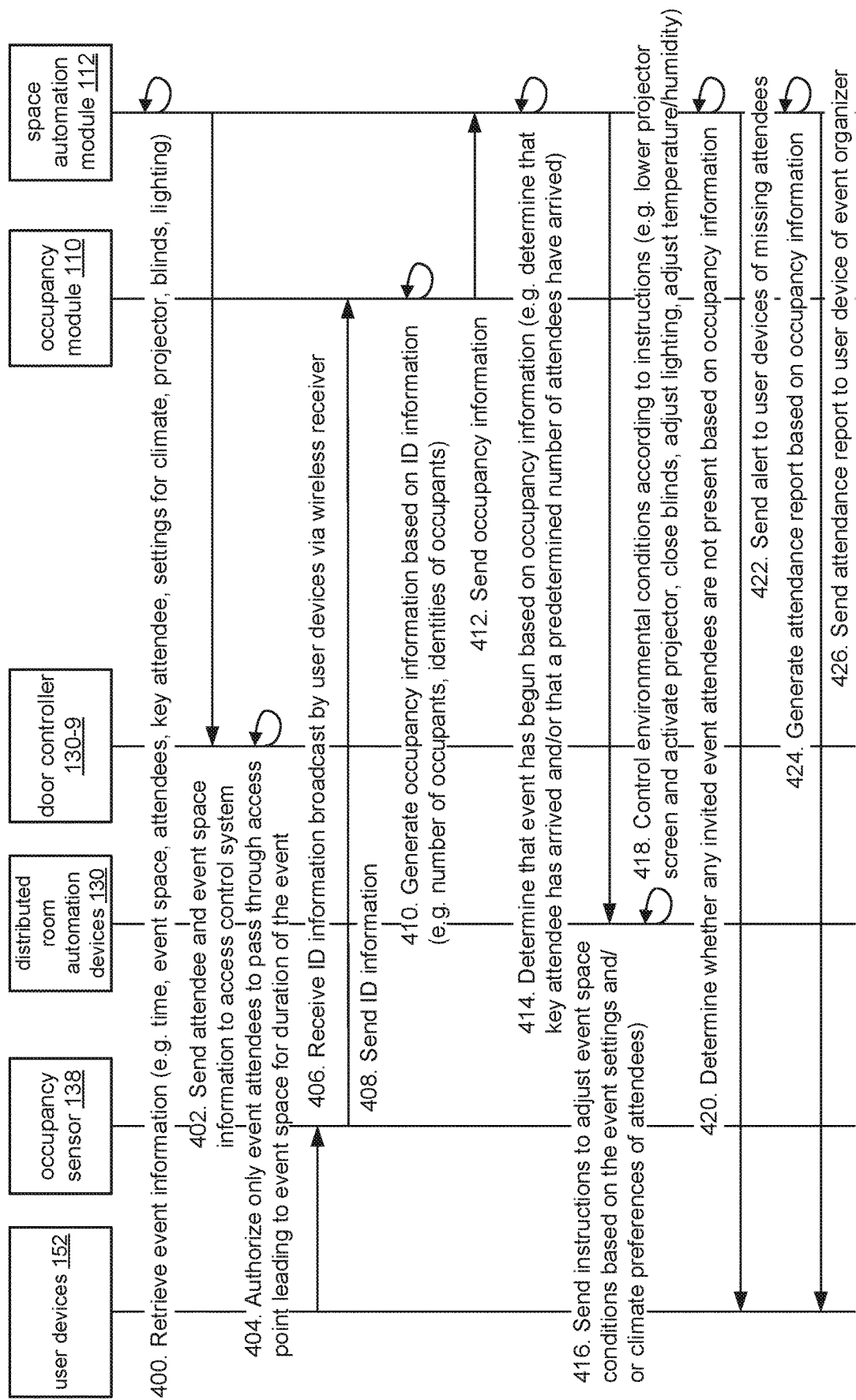
FIG. 4A is a sequence diagram showing an example of how a space automation module of the event automation system controls environmental conditions for scheduled events based on occupancy information.

FIG. 4A is a sequence diagram showing an example of how the space automation module 112 controls the environmental conditions for scheduled events based on the occupancy information for the event space 105.

In step 400, the space automation module 112 retrieves event information for scheduled events from the scheduled event table 184 of the connected services database 106. The event information includes time and date information, event space information identifying the event space 105 where the event is scheduled, attendee information, including identities of the attendees 150 and any key attendees 105-1, and configuration information, including settings for the climate, projector, blinds, and lighting at the event space 105.

In step 402, the space automation module 112 sends the attendee information and the event space information to the access control system (e.g. to the door controller 130-9 controlling access to the event space 105 where the event is scheduled).

In step 404, the access control system controls access to the event space 105 based on the attendee information and the event space information. In one example, the door controller 130-9 authorizes and grants access only to attendees 150 of the scheduled event and/or authorizes and grants access to the attendees 150 of the scheduled event only during the time period during which the event is scheduled.

In step 406, on a continual basis, the occupancy sensor 138 installed at the event space 105 where the event is scheduled receives (for example, via a wireless receiver) identification information broadcast by mobile computing devices 152 and/or user devices such as identification badges and/or beacon devices of the attendees 150. In step 408, the occupancy sensor 138 sends the identification information to the occupancy module 110.

In step 410 the occupancy module 110 generates the occupancy information based on the received identification information. The occupancy information includes information about the quantity and identities of present attendees 150-1, 150-2. In step 412, the occupancy module 110 sends the occupancy information to the space automation module 112.

In step 414, the space automation module 112 determines that the scheduled event has begun based on the occupancy information and the event information. In one example, the space automation module 112 infers that the scheduled event has begun based on determining that the key attendee 150-1 is present at the event space 105. In another example, the space automation module 112 infers that the scheduled event has begun based on determining that a predetermined number of attendees 150 are present at the event space 105. Based on this determination, in step 416, the space automation module 112 sends instructions to the distributed devices 130 controlling the environmental conditions at the event space (e.g. distributed devices 130 of the building automation system installed in the event space 105) to adjust the environmental conditions based on the configuration information and/or the climate preferences of the attendees 150.

In step 418, the distributed devices 130 control the environmental conditions according to the instructions (e.g. lowering the projector screen, closing the blinds, adjusting the lighting, adjusting the temperature and/or humidity settings).

In step 420, the space automation module 112 determines, based on the occupancy information, whether there are any missing attendees 150-3 such as attendees 150 who were indicated as invited to the scheduled event but who are not present at the event space 105. In step 422, the space automation module 112 sends an alert to the mobile computing devices 152-3 of the missing attendees 150-3.

In step 424, the space automation module 112 generates attendance information (e.g. an attendance report) and sends the attendance information to the mobile computing devices 152-1 of the event organizer 150-1.

Figure 4B:
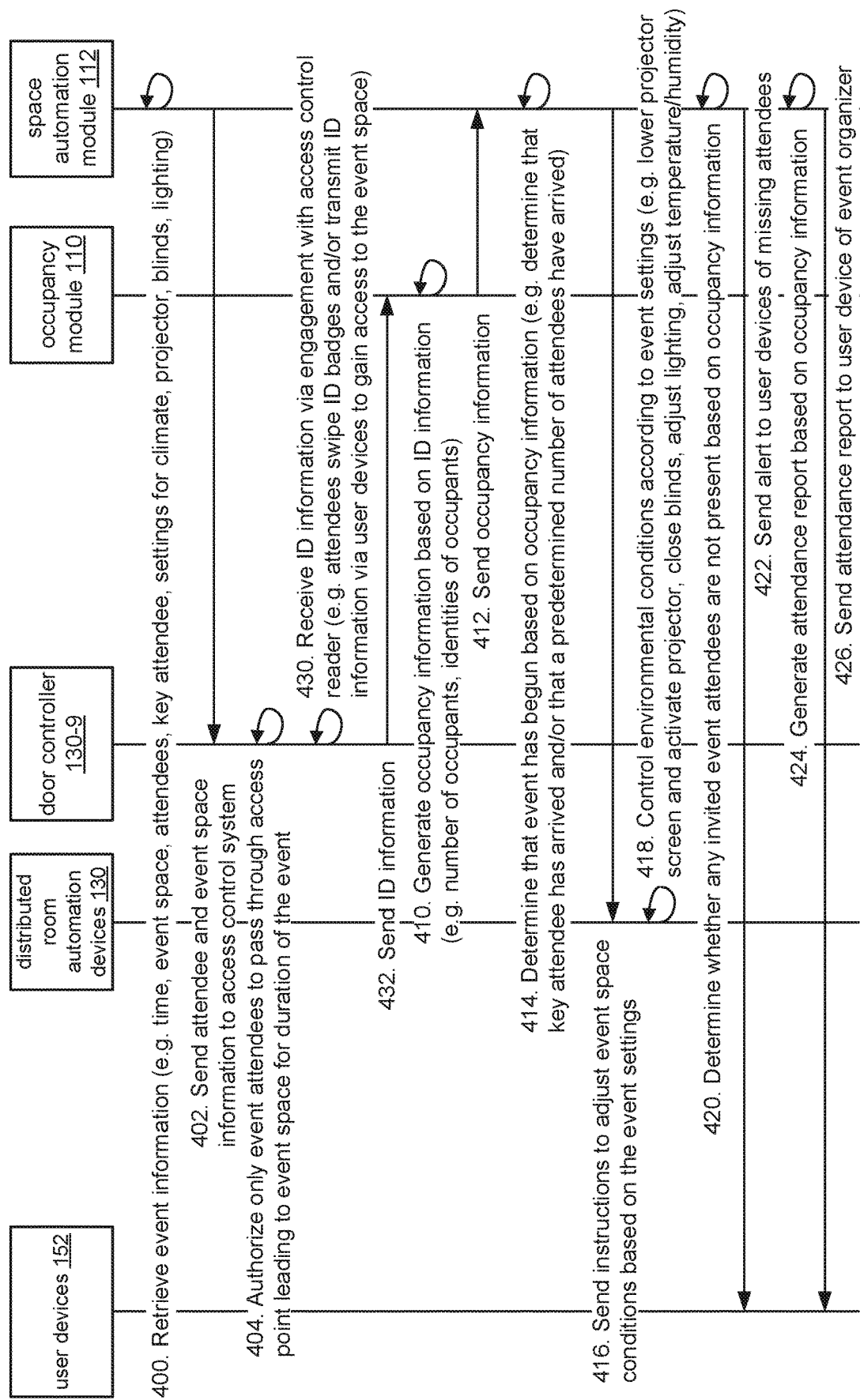
FIG. 4B is a sequence diagram illustrating an example of how the space automation module controls the environmental conditions for the scheduled events according to an alternative embodiment.

FIG. 4B is a sequence diagram illustrating an example of how the space automation module 112 controls the environmental conditions for scheduled events according to an alternative embodiment in which the occupancy module 110 receives identification information from the door controller 130-9 controlling access to the event space 105.

Steps 400 through 404 proceed as previously described.

Now, however, in step 430, the door controller 130-9 receives identification information based on attendees 150 engaging with the access control reader 130-8 in order to gain access through the access point 120 into the event space 105. In one example, the access control reader 130-8 receives identification information from mobile computing devices 152, identification badges and/or beacon devices of the attendees 150. In another example, the access control reader 130-8 receives manual input (e.g. via a keypad or other user interface) identifying the attendees 150. In step 432, the door controller 130-9 sends the identification information received by the access control reader 130-8 to the occupancy module 110.

Steps 414 through 426 then proceed as previously described.

Figure 4C:
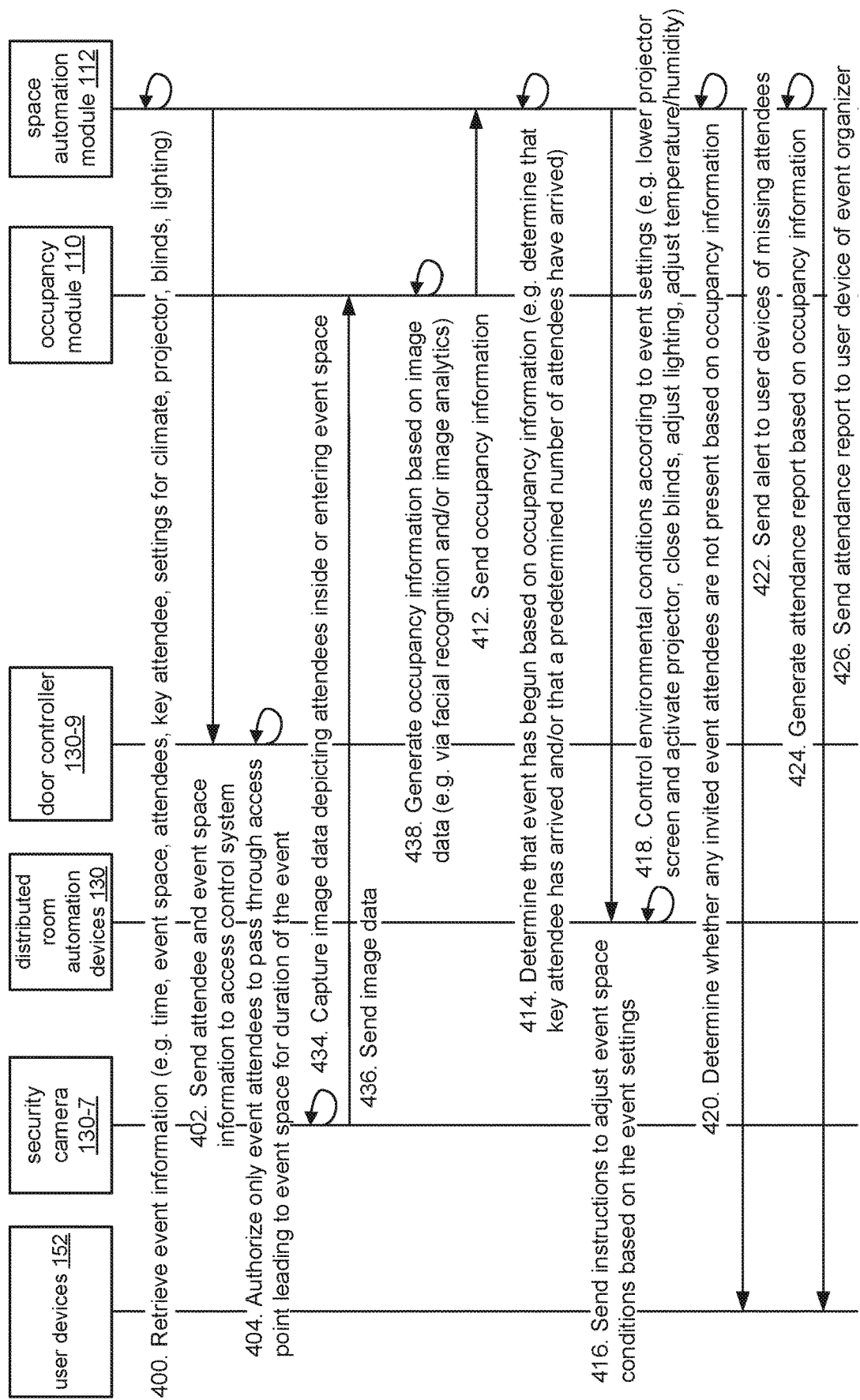
FIG. 4C is a sequence diagram illustrating an example of how the space automation module controls the environmental conditions for the scheduled events according to another alternative embodiment.

FIG. 4C is a sequence diagram illustrating an example of how the space automation module 112 controls the environmental conditions for scheduled events according to an alternative embodiment in which the occupancy module 110 generates the occupancy information based on image data captured by the security cameras 130-7.

Steps 400 through 404 proceed as previously described.

Now, however, in step 434, the security camera 130-7 captures image data depicting attendees 150 inside or entering the event space 105. The security camera 130-7 sends the image data to the occupancy module 110 in step 436.

In step 438, the occupancy module 110 generates the occupancy information based on the image data (e.g. via facial recognition and/or image analytics).

Figure 5:
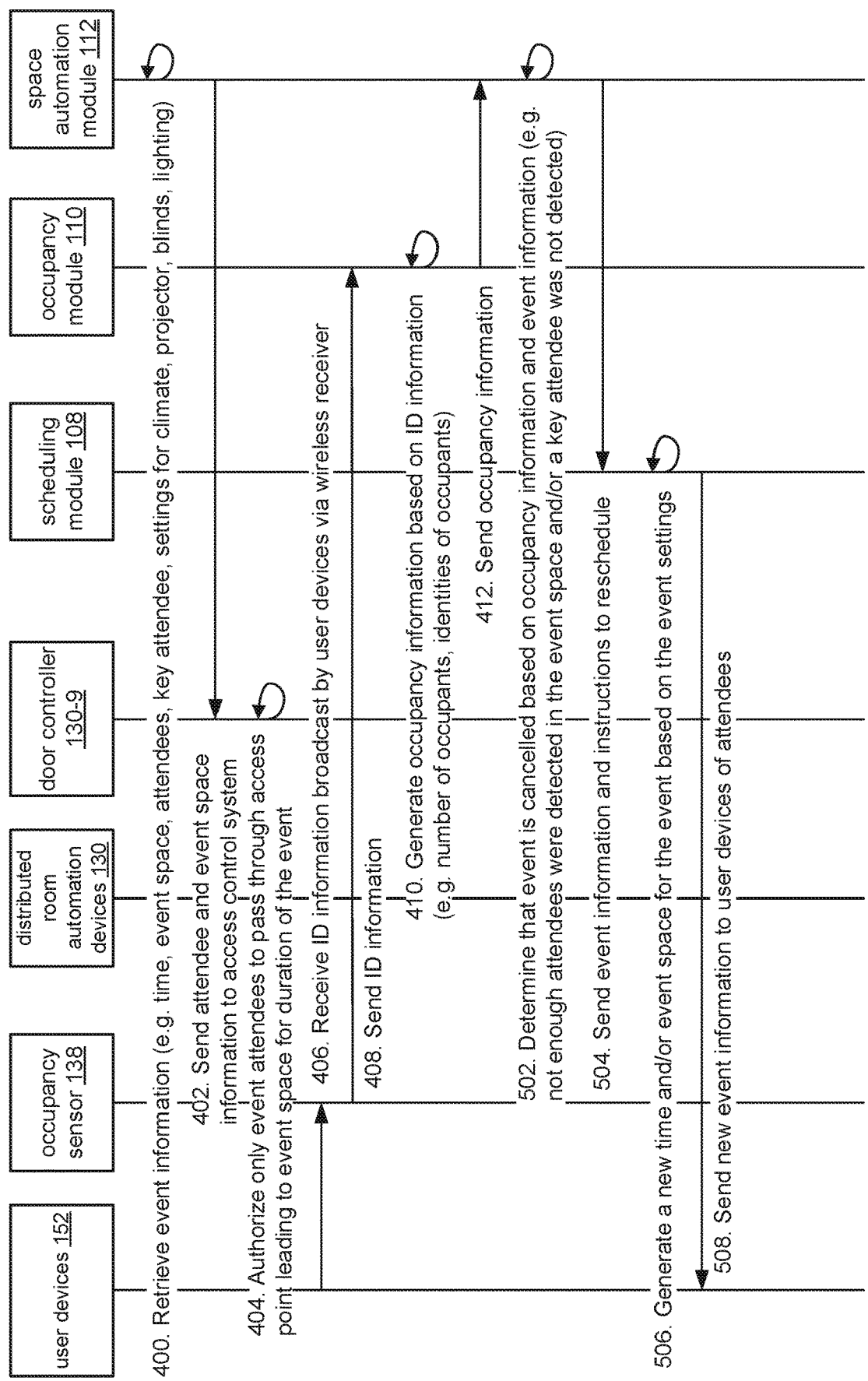
FIG. 5 is a sequence diagram illustrating an example of how the space automation module reschedules the scheduled events based on the occupancy information.

FIG. 5 is a sequence diagram illustrating an example of how the space automation module 112 reschedules the scheduled events based on the occupancy information.

Steps 400 through 412 proceed as previously described.

Now, however, in step 502, the space automation module 112 infers that the scheduled event is or should be cancelled based on the occupancy information and the event information. In one example, the space automation module 112 determines that less than a predetermined number of attendees 150 are present at the event space 105. In another example, the space automation module 112 determines that one or more key attendees 150-1 are not present at the event space 105.

In step 504, the space automation module 112 sends the event information to the scheduling module 108 along with instructions to reschedule the event.

In step 506, the space automation module 108 generates a new time and/or event space 105 for the event based on the configuration information. Finally, in step 508, the scheduling module 108 sends the new event information to the mobile computing devices 152 of the attendees 150, informing them that the event was cancelled and informing them of the newly schedule time and event space 105 for the event.

While this invention has been particularly shown and described with references to preferred embodiments thereof, it will be understood by those skilled in the art that various changes in form and details may be made therein without departing from the scope of the invention encompassed by the appended claims.

What is claimed is:

1. A building automation method, the method comprising:
receiving, by a scheduling module executing on a server system of a building automation system, event configuration information from user devices for events to be scheduled at spaces of a building;
determining, by the scheduling module, required building automation features for the events to be scheduled based on the event configuration information;
generating, by the scheduling module, location information for the events to be scheduled based on the event configuration information;
selecting, by the scheduling module, spaces for the events based on the required building automation features, the location information, and energy efficiency of the building automation system, wherein selecting spaces for the events based on the energy efficiency of the building automation system comprises the scheduling module selecting spaces based on residual heating from other used spaces;
sending the selected spaces to the user devices; and
controlling operations of the building automation system based on the selected spaces.

2. The method as claimed in claim 1, further comprising:
generating the aggregated usage information for the spaces based on the event configuration information; and
further selecting spaces for the events based on the aggregated usage information.

3. The method as claimed in claim 2, further comprising selecting spaces that are indicated as having events scheduled immediately before and/or immediately after the events to be scheduled according to the aggregated usage information.

4. The method as claimed in claim 1, further comprising determining the required building automation features based on anticipated activities of the events to be scheduled according to the event configuration information.

5. The method as claimed in claim 1, further comprising generating the location information based on exercise preferences of attendees indicated as attending the events according to the event configuration information.

6. The method as claimed in claim 5, wherein the exercise preferences include an indication of individual preferences for attendees of the events regarding whether additional exercise is desired by the attendees.

7. The method as claimed in claim 1, further comprising generating the location information based on location information for attendees indicated as attending the events according to the event configuration information.

8. The method as claimed in claim 1, wherein selecting spaces for the events based on the energy efficiency of the building automation system comprises selecting the spaces based on consecutive events scheduled at the selected spaces allowing temperatures of the selected spaces to be kept constant.

9. The method as claimed in claim 1, wherein selecting spaces for the events based on the energy efficiency of the building automation system comprises selecting the spaces and then updating the selected spaces as events are canceled or rescheduled to maintain efficiency at an optimal level.

10. The method as claimed in claim 1, wherein selecting spaces for the events based on the energy efficiency of the building automation system comprises selecting the spaces based on usage and/or energy consumption information for the building automation system.

11. The method as claimed in claim 1, wherein selecting spaces for the events based on the required building automation features comprises selecting the spaces based on whether a potential space to be selected offers automated window blinds functionality when the event is being scheduled at a time with excessive sun light shining through windows of the building.

12. A building automation system, the system comprising:
a server system for executing a scheduling module for receiving event configuration information from user devices for events to be scheduled, determining required building automation features for the events to be scheduled based on the event configuration information, generating location information for the events to be scheduled based on the event configuration information, selecting spaces for the events based on the required building automation features, the location information, and energy efficiency of the building automation system, wherein selecting spaces for the events based on the energy efficiency of the building automation system comprises selecting spaces based on residual heating from other used spaces, and controlling operations of the building automation system based on the selected spaces.

* * * * *